US008327254B2

(12) United States Patent
Chen et al.

(10) Patent No.: US 8,327,254 B2
(45) Date of Patent: Dec. 4, 2012

(54) METHOD AND SYSTEM FOR ASSOCIATING ONE OR MORE CONTENTS WITH AN ELECTRONIC PAGE

(75) Inventors: Shao-Chun Chen, Irvine, CA (US); Kunlin Chen, Shanghai (CN); Harri Okkonen, Dana Point, CA (US)

(73) Assignee: Wishfi Pte. Ltd, Singapore (SG)

( * ) Notice: Subject to any disclaimer, the term of this patent is extended or adjusted under 35 U.S.C. 154(b) by 1233 days.

(21) Appl. No.: 11/934,087

(22) Filed: Nov. 2, 2007

(65) Prior Publication Data

US 2010/0031136 A1  Feb. 4, 2010

Related U.S. Application Data

(60) Provisional application No. 60/865,156, filed on Nov. 9, 2006, provisional application No. 60/916,290, filed on May 6, 2007, provisional application No. 60/970,539, filed on Sep. 7, 2007.

(51) Int. Cl.
*G06F 17/00* (2006.01)
(52) U.S. Cl. ........................................ 715/208; 715/205
(58) Field of Classification Search .................. 715/205, 715/234, 235, 243, 208
See application file for complete search history.

(56) References Cited

U.S. PATENT DOCUMENTS

| | | | |
|---|---|---|---|
| 5,999,912 A * | 12/1999 | Wodarz et al. | 705/14.61 |
| 6,760,916 B2 * | 7/2004 | Holtz et al. | 725/34 |
| 7,188,085 B2 * | 3/2007 | Pelletier | 705/50 |
| 7,509,490 B1 * | 3/2009 | Hsu et al. | 713/162 |
| 7,552,113 B2 * | 6/2009 | Roe et al. | 1/1 |
| 2002/0087573 A1 * | 7/2002 | Reuning et al. | 707/102 |
| 2002/0112002 A1 | 8/2002 | Abato | |
| 2003/0023489 A1 * | 1/2003 | McGuire et al. | 705/14 |
| 2005/0033641 A1 | 2/2005 | Jha et al. | |
| 2005/0144073 A1 * | 6/2005 | Morrisroe et al. | 705/14 |
| 2005/0198116 A1 | 9/2005 | Appleman et al. | |
| 2007/0260520 A1 * | 11/2007 | Jha et al. | 705/14 |

* cited by examiner

*Primary Examiner* — Manglesh M Patel
(74) *Attorney, Agent, or Firm* — Timberline Patent Law Group PLLC; Mark Farrell

(57) ABSTRACT

A method and system for associating one or more contents with an electronic page. The method includes receiving a request for the electronic page from a user. The method further includes processing the request in a predefined manner. Thereafter, the method includes selecting one or more contents in response to processing the request. Further, the method includes rendering one or more contents along with the electronic page in a predetermined format.

14 Claims, 8 Drawing Sheets

METHOD AND SYSTEM FOR ASSOCIATING ONE OR MORE CONTENTS WITH AN ELECTRONIC PAGE

RELATED APPLICATIONS

Benefit is claimed under 35 U.S.C. 119(e) to U.S. Provisional Application Ser. Nos. 60/865,156, entitled "Wireless/Wired Share Fidelity—A new method to enable network sharing along with third party information delivery" by SHAO-CHUN CHEN et al., filed on 9 Nov. 2006, 60/916,290, entitled "Wishfi Technology—A platform and a distributed solution of advertisement enabled Internet access to service providers" by SHAO-CHUN CHEN et al., filed on 6 May 2007 and 60/970,539, entitled "Wishfi Virtual Browser Toolbar and Adsure Technology—Concept and Technology" by SHAO-CHUN CHEN et al., filed on 7 Sep. 2007 which is herein incorporated in its entirety by reference for all purposes.

FIELD OF THE INVENTION

The present invention generally relates to a communication network. More specifically, the present invention relates to a method and system for associating one or more contents with an electronic page in a communication network.

BACKGROUND OF THE INVENTION

Internet has long proved to be the most exhaustive repository of the information available in different domains, be it telecommunications, science, engineering, celebrity talk or the local news of a particular place. Consequently, the use of computer network to access information available on the internet is ever increasing. Internet is also a very powerful communication tool and allows people spread across different continents come together on a common platform. To keep themselves updated with the latest happenings around the globe millions of people across the world access internet on a regular basis.

It is no wonder that the advertisement industry too has targeted the internet for reaching the consumers directly. Recent times have seen an explosive growth in the online advertisement industry and advertisement providers are targeting all the users accessing various contents on the internet. There are several dedicated advertisement providers that provide advertisements to be shown alongside an electronic page. Several revenue sharing models have also been developed which benefit the advertisement providers.

There are many ways of providing advertisements on the internet. For example, through email attachment, as pop up window and as a multi-media clip. However, the plethora of advertisements is not always appreciated by the end user and many times it is also observed that these advertisements are randomly selected and are not of any use or interest to the user. As a result, the user starts ignoring or blocking these advertisements. This reduces the effectiveness of the known forms of advertisements, even for advertisements that can be of interest to the user.

There is therefore a need for a system and method for providing relevant advertisements to a user in a reliable manner which ensure that the advertisements are delivered to the device of the user without getting blocked.

SUMMARY OF THE INVENTION

An object of the invention is to provide a method and system for providing advertisements to a user through internet.

Another object of the invention is to provide a method and system for providing advertisements to a user based on user's profile and interests.

Another object of the invention is to provide a method and system for facilitating an internet service provider to generate revenue by providing one or more advertisements along with a requested electronic page.

Yet another object of the invention is to provide a system and method that prevents blocking of the advertisements by the user and ensures that the advertisement is viewed by the user.

The above listed objects are achieved by providing a method and system for associating one or more contents with an electronic page. The method includes receiving a request for the electronic page from a user. The method further includes processing the request in a predefined manner. Thereafter, the method includes selecting one or more contents in response to processing the request. Further, the method includes rendering one or more contents along with the electronic page in a predetermined format.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
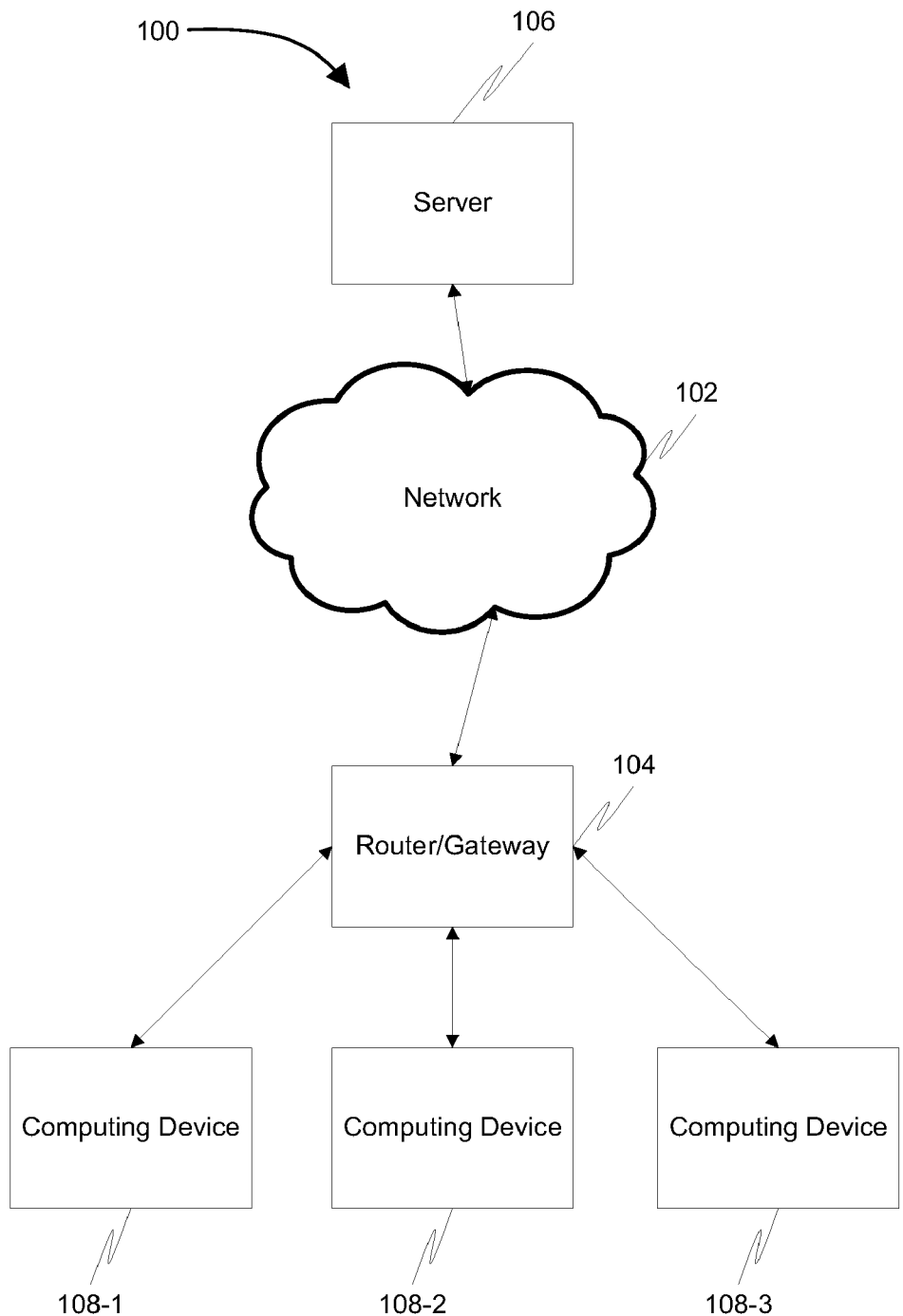
FIG. 1 is a block diagram showing an exemplary environment in which various embodiments of the invention can function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and system components related to method and system for associating one or more contents with an electronic page. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the present invention provides a method and system for associating one or more contents with an electronic page.

FIG. 1 is a block diagram showing an environment 100 (that is exemplary) in which various embodiments of the invention can function. Environment 100 includes a network 102, a router/gateway 104, a server 106 hosting an electronic page and one or more computing devices 108-n. Examples of computing device 108-n may include, but are not limited to, a cell phone, a pager, a laptop, a computer, a scanner, a fax machine, a Personal Digital Assistant (PDA), a set top box, a router and an access point. When computing device 108-1 receives a request for the electronic page hosted by server 106 from a user, it directs the request to router 104. Thereafter, router 104 processes the request and relays it to server 106. Server 106 renders the electronic page along with one or more contents to router 104. Thereafter, router 104 relays the electronic page along with one or more contents to the user through computing device 108-1. It would be apparent to a person skilled in the art that computing device 108-1, computing device 108-2 and computing device 108-3 may access internet or a server using different routers.

Figure 2:
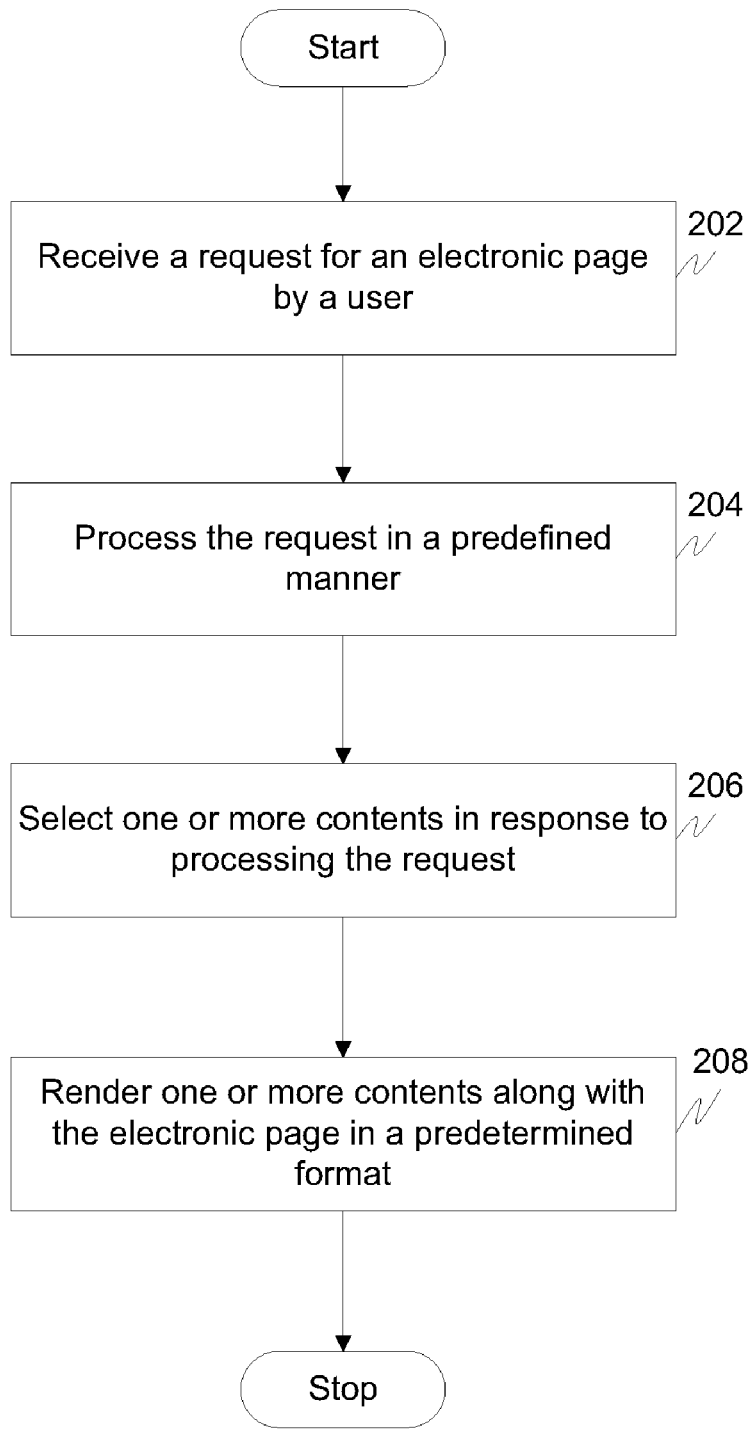
FIG. 2 illustrates a flowchart of a method for associating one or more contents with an electronic page, in accordance with an embodiment of the invention.

FIG. 2 is a flowchart illustrating a method for associating one or more contents with an electronic page, in accordance with an embodiment of the invention. At step 202, a request for an electronic page is received from a user. The request can be for example, but not limited to a Hyper Text Transfer Protocol (HTTP) request for a website corresponding to content as desired by the user. Thereafter, at step 204, the request is processed in a predefined manner. The processing step has been explained in detail in conjunction with FIG. 3. In response to processing the request, one or more contents are selected at step 206. Examples of one or more contents include but are not limited to a text-based advertisement, an image-based advertisement, a multimedia-based advertisement, links to other websites, information other than advertisement like local weather forecast, news alert and location based information.

In an embodiment, one of one or more contents is a virtual toolbar. The virtual toolbar may be based on, for example, but not limited to, the service area and location of a user. The virtual toolbar may be rendered along with the electronic page as a banner with one or more banner spaces displaying one or more contents.

Once one or more contents are selected at step 206, one or more contents are rendered along with the electronic page requested by the user in a predetermined format at step 208. The predefined format can be for example, but is not limited to an off-page rendering of one or more contents, an in-page rendering of one or more contents and a frame-based rendering of one or more contents.

During an off page rendering of one or more contents, one or more contents are displayed in a full page manner for a period of time before displaying the electronic page requested by the user. In an in-page rendering of one or more contents, one or more contents are embedded in a part of the electronic page requested by the user. In an embodiment, one or more contents are embedded such that one or more contents may or may not scroll with the electronic page as the electronic page is scrolled by the user. Further, in the frame-based rendering of one or more contents, one or more contents are embedded in a frameset along with the electronic page requested by the user. In an embodiment of the frame-based rendering, a browser may be divided into one or more banner spaces. Thereafter, one or more contents are placed in one or more banner spaces for displaying it to the user along with the electronic page requested by the user.

Figure 3:
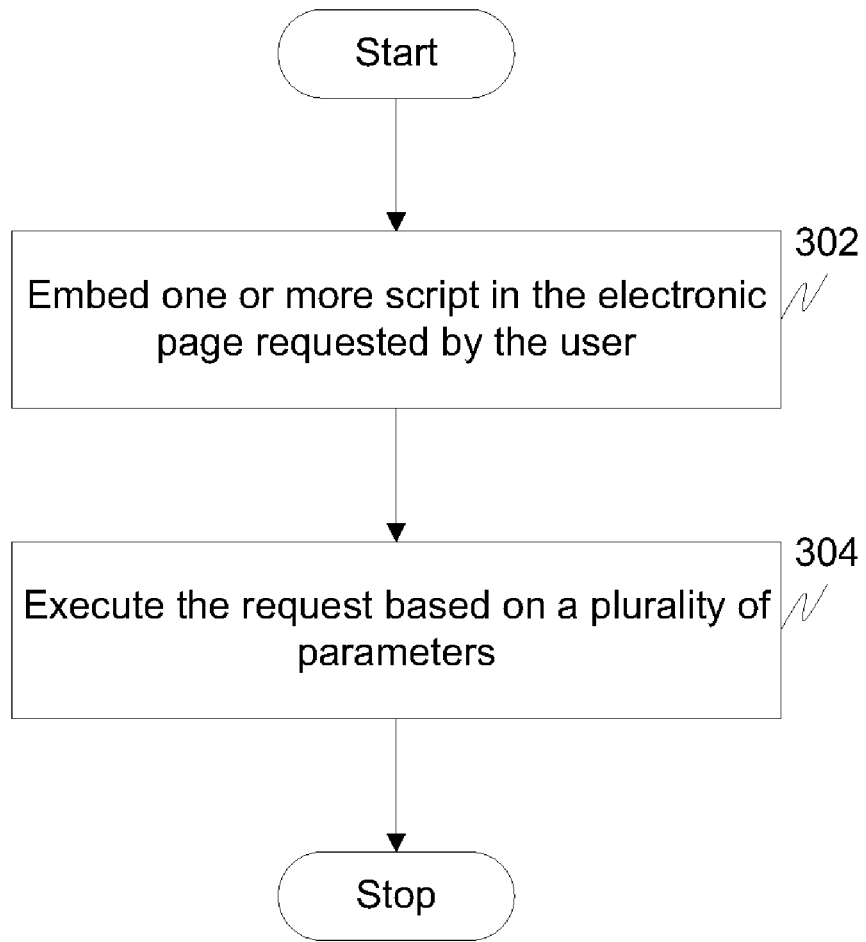
FIG. 3 illustrates a flowchart of a method for processing a request for an electronic page in a predefined manner, in accordance with an embodiment of the invention.

FIG. 3 is a flowchart illustrating a method for processing a request for an electronic page in a predefined manner, in accordance with an embodiment of the invention. At step 302, one or more scripts are embedded in the electronic page requested by the user. In order to process the request, one or more scripts embedded in the electronic page retrieve a plurality of parameters associated with the user and communication link established for browsing the internet. Further, one or more scripts also request for one or more contents to be associated based on the electronic page requested by the user. In an embodiment, the plurality of parameters can be the user's profile and information pertaining to the access point and the internet session. The user's profile may include, but not limited to, age of the user, gender information of the user, language preferences of the user, business type, hobbies of the user and user's preset preferences. Further, information pertaining to the access point may include, but not limited to, the geographical location, Internet Protocol (IP) address, local time, signal strength, a network provider's preset preference and a serial number associated with the access point. Also, the information pertaining to the internet session may include, but not limited to, the content corresponding to the electronic page requested by the user, visited Universal Resource Locators (URLs), the time when the internet session started and the length of the duration of the internet session. Thereafter at step 304, the request for the electronic page is executed based on the plurality of parameters mentioned above. This is further explained in conjunction with FIG. 4.

Figure 4:
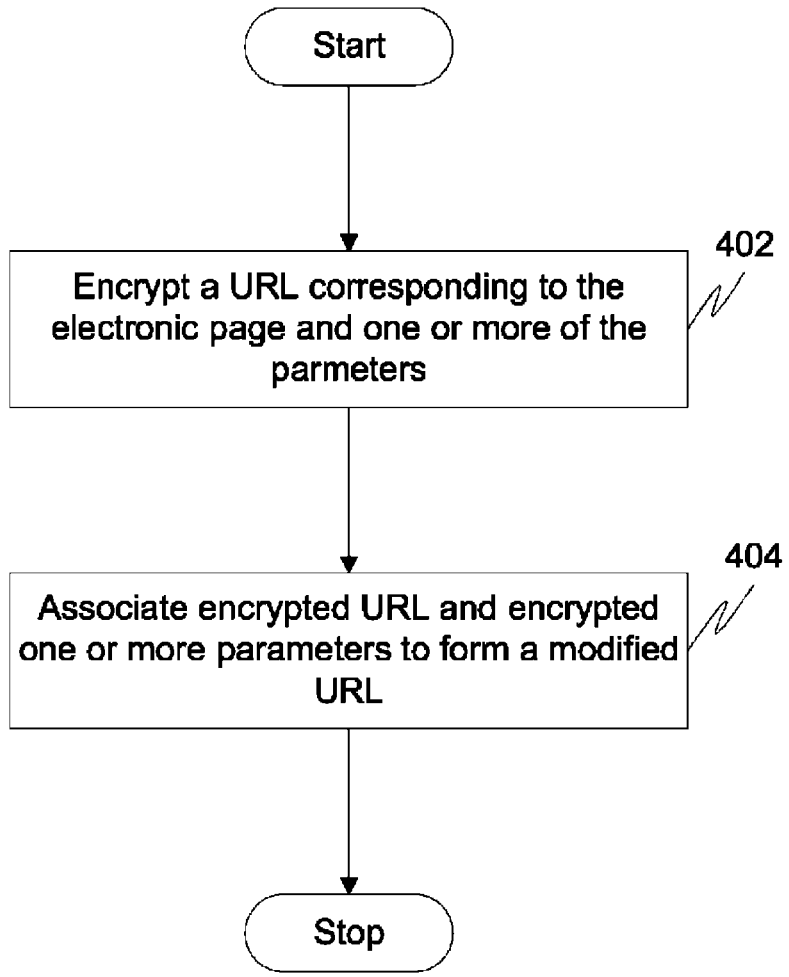
FIG. 4 illustrates a flowchart of a method for executing a request based on a plurality of parameters, in accordance with an embodiment of the invention.

FIG. 4 is a flowchart illustrating a method for executing a request based on a plurality of parameters, in accordance with an embodiment of the invention. In response to embedding one or more scripts in an electronic page, a URL corresponding to the electronic page and one or more parameters are encrypted at step 402, Thereafter, at step 404, the encrypted URL is associated with one or more parameters to form a modified URL corresponding to the electronic page. In an embodiment, the URL is modified in order to send an encrypted request for one or more contents to be associated with the electronic page without getting blocked by the browser and/or computing device of the user. In an embodiment, the URL is encrypted in a way that the encrypted URL is in the same format as the original URL, therefore the browser and/or computing device of the user do not block the URL from being processed and thereby can not block the request for one or more contents to be associated with the electronic page. For example, if a URL corresponding to a request for one or more contents is in the format of http://domain/script.php?parameters, and the URL requested by the user is in the format of http://abc.com/index.php/12?, the URL requested by the user is modified in order to pass on the message in the URL corresponding to the request for one or more contents. Therefore, the modified URL may be in the format of http://abc.com/t124vdr3?q=cvb. Here, "t124vdr3?q=cvb" contains the message regarding one or more contents to be associated with the electronic page, also, the domain, "abc.com" is kept unchanged so that the browser and/or computing device of the user consider it to be a genuine request for an information on the domain http://www.abc.com.

While encrypting the information pertaining to the user profile, a hashing mechanism can be used to maintain the privacy of the user. A hash is generated based on user's common information for example, age of the user, gender of the user, language preference of the user, but not from a unique identity corresponding to the user. Once the encrypted URL request is sent by one or more scripts, the encrypted URL is decoded in order to retrieve the message/information pertaining to one or more contents. Thereafter, one or more contents are identified based on one or more parameters and a content corresponding to the electronic page requested by the user. In an embodiment, one or more contents can be searched by a proprietary server or a third party server. Also, the electronic page requested by the user may be searched by an HTTP server. The identified one or more contents are associated with the electronic page requested by the user in a predefined format. The predefined format has been explained already in conjunction with FIG. 2. Further, if a request for one or more contents is not received for a predetermined time interval, a predefined action is performed. The reason for not receiving the request for one or more contents can be because of blocking of one or more requests by the browser and/or computing device of the user. The predefined action can be for example, but not limited to temporary service interruption for the user and subsequent redirection of the user to a warning page displaying the reasons for service interruption.

In order to effectively associate one or more contents with an electronic page, the content corresponding to the electronic page can be indexed and in turn categorized for better selection of appropriate one or more contents to be displayed along with the electronic page. The indexing may be done using a proprietary indexing software. The indexing information may be stored in a database for subsequent references.

Figure 5:
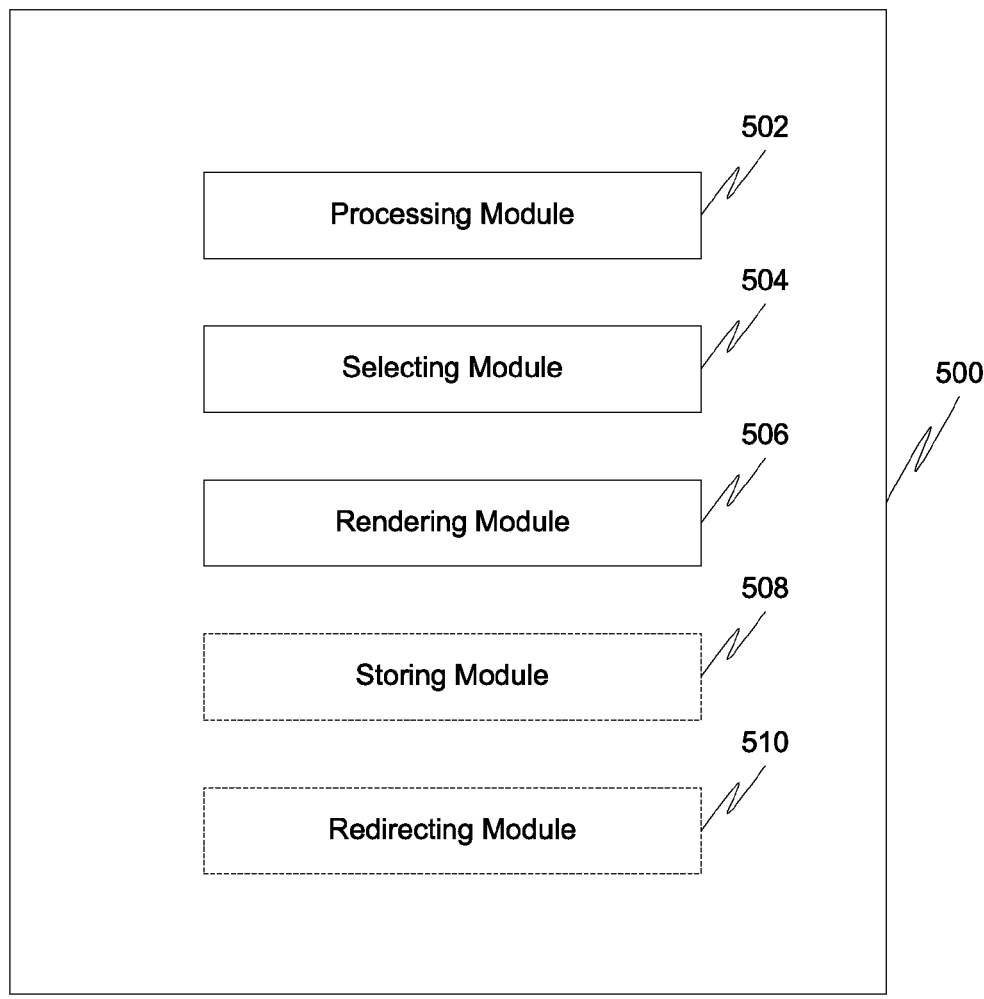
FIG. 5 is a block diagram showing a system for associating one or more contents with an electronic page, in accordance with an embodiment of the invention.

FIG. 5 is a block diagram showing a system 500 for associating one or more contents with an electronic page, in accordance with an embodiment of the invention. System 500 includes a processing module 502, a selecting module 504 and a rendering module 506.

System 500 receives a request for an electronic page. The request can be for example, but not limited to a Hyper Text Transfer Protocol (HTTP) request for a website corresponding to content as desired by the user. In response to receiving the request, processing module 502 processes the request for the electronic page in a predefined manner. Processing module 502 is further explained in detail in conjunction with FIG. 6. Once, the request is processed, selecting module 504 selects one or more contents. Examples of one or more contents include but are not limited to a text based advertisement, an image-based advertisement, a multimedia-based advertisement, links to other websites, information other than advertisement like local weather forecast, news alert and location based information. Thereafter, rendering module 506 renders one or more contents along with the electronic page requested by the user in a predetermined format. The predefined format can be for example, but is not limited to an off-page rendering of one or more contents, an in-page rendering of one or more contents and a frame-based rendering of one or more contents.

System 500 further includes a storing module 508. In an embodiment, storing module stores one or more contents to be associated with an electronic page based on the processing of the request for the electronic page. In an exemplary embodiment, storing module 508 can store one or more advertisements corresponding to one or more products, services and business providers. System 500 also includes a redirecting module 510. Redirecting module redirects a user to a predefined electronic page, when it is determined that one or more contents to be associated with the electronic page are not requested and/or blocked for a predetermined time interval. In an embodiment, redirecting module 510 may also temporarily interrupt the network service for the user.

Figure 6:
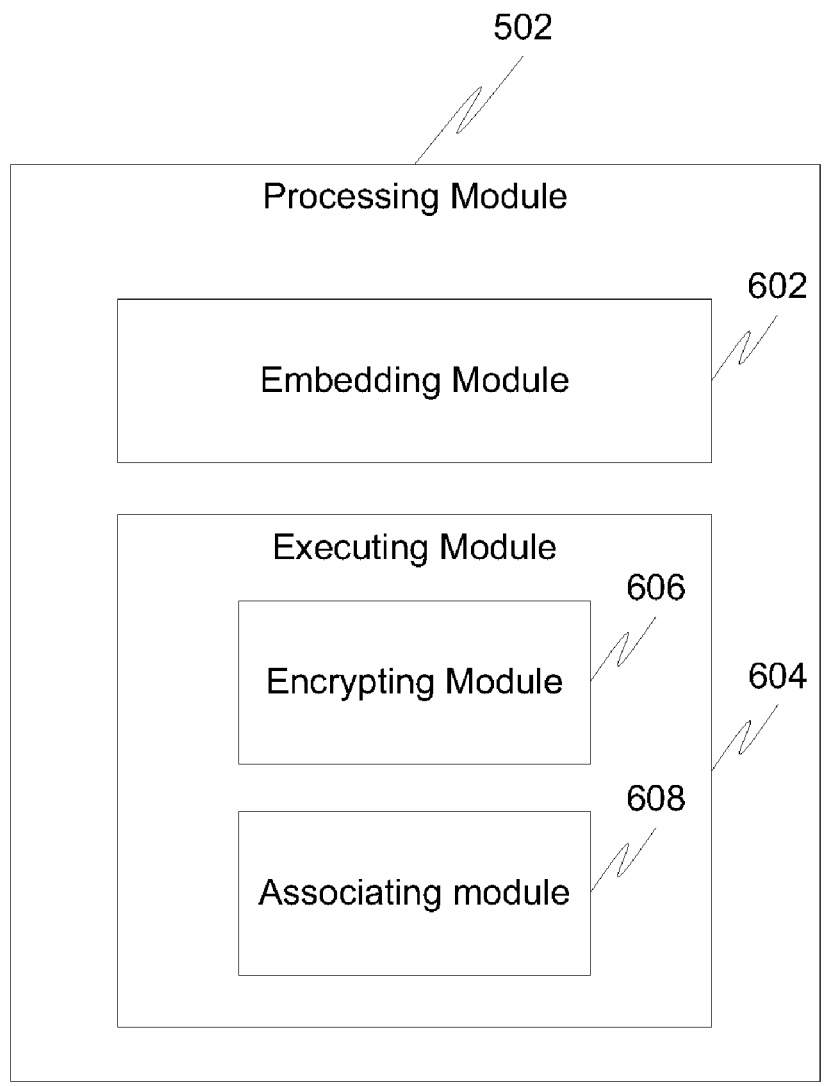
FIG. 6 is a block diagram showing a system for processing a request for an electronic page in a predefined manner, in accordance with an embodiment of the invention

FIG. 6 is a block diagram showing processing module 502 for processing a request for an electronic page in a predefined manner, in accordance with an embodiment of the invention. Processing module 502 includes an embedding module 602 and an executing module 604. Embedding module 602 embeds one or more scripts in the electronic page requested by the user. In order to process the request, one or more scripts embedded in the electronic page retrieve a plurality of parameters associated with the user and communication link established for browsing the internet. Further, one or more scripts also request for one or more contents to be associated based on the electronic page requested by the user. In an embodiment, the plurality of parameters can be the user's profile and information pertaining to the access point and the internet session. The user's profile may include, but is not limited to, age of the user, gender information of the user, language preferences of the user, business type, hobbies of the user and user's preset preferences. Further, information pertaining to the access point may include, but not limited to, the geographical location, Internet Protocol (IP) address, local time, signal strength, a network provider's preset preference and a serial number associated with the access point. Also, the information pertaining to the internet session may include, but is not limited to, the content corresponding to the electronic page requested by the user, visited Universal Resource Locators (URLs), the time when the internet session started and the length of the duration of the internet session. Thereafter, the request for the electronic page is executed by executing module 604.

Executing module 604 includes an encrypting module 606 and an associating module 608. In response to embedding one or more scripts in the electronic page, encrypting module 606 encrypts one or more scripts in the electronic page, the URL corresponding to the electronic page and one or more parameters. Thereafter, the encrypted URL is associated with one or more parameters by the associating module 608 to form a modified URL corresponding to the electronic page. In an embodiment, the URL is modified in order to send an encrypted request for one or more contents to be associated with the electronic page without getting blocked by the browser and/or computing device of the user. In an embodiment, the URL is encrypted in a way that the encrypted URL is in the same format as the original URL, therefore the browser and/or computing device of the user do not block the URL from being processed and thereby can not block the request for one or more contents to be associated with the electronic page.

Once the encrypted URL request is sent by executing module 604, the encrypted URL is decoded in order to retrieve the message/information pertaining to one or more contents. Thereafter, selecting module 504 selects one or more contents based on one or more parameters and a content corresponding to the electronic page requested by the user and it is rendered to the user.

Figure 7:
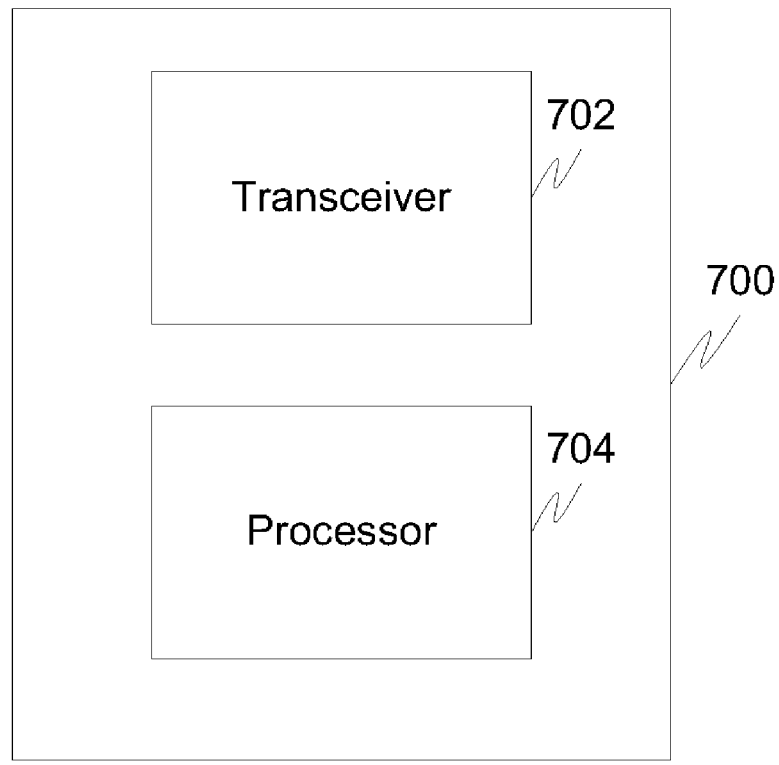
FIG. 7 is a block diagram showing a device for associating one or more contents with an electronic page, in accordance with an embodiment of the invention

FIG. 7 is a block diagram showing a device 700 for associating one or more contents with an electronic page, in accordance with an embodiment of the invention. Device 700 includes a transceiver 702 and a processor 704. Transceiver 702 receives a request for the electronic page by a user. In response to receiving the request for the electronic page, processor operatively coupled with transceiver 702 processes the request. In an embodiment, the processor 704 is configured with a proprietary software for processing the request for the electronic page. Processor 704 processes the request in a predefined manner. Thereafter, one or more contents to be associated with the electronic page are selected and are associated with the electronic page. At last, the electronic page along with one or more contents is rendered to the user. In an exemplary embodiment, device 700 can be for example, but is not limited to a PDA, a cell phone and a pager.

Figure 8:
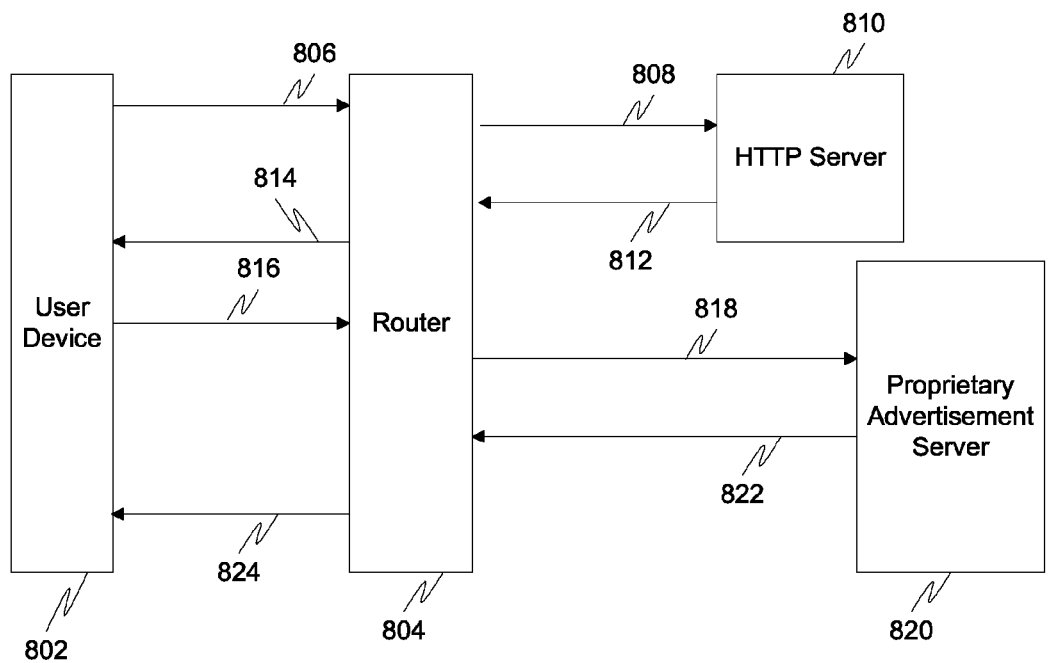
FIG. 8 is a flow diagram showing execution of a method and system for associating one or more contents with an electronic page, in accordance with an exemplary embodiment of the invention.

FIG. 8 is a flow diagram showing execution of a method and system for associating one or more contents with an electronic page, in accordance with an exemplary embodiment of the invention. A user with a device 802 is subscribed to network services provided by a network service provider. One or more requests for accessing one or more electronic pages are routed to the corresponding electronic pages by a router 804 which is controlled by the network provider. The network provider may collect a subscription charges from the user based on the subscription agreement of the network provider. Typically, the subscription charges cover the network charges, service charges and the maintenance charges of the network. The network provider can also tie up with other business service providers to provide additional content to the user and in turn can generate more revenue. The additional content can be for example, value additional services or advertisements corresponding to services and/or products provided by the business service providers. The network provider can charge the business service provider for this service based on pay per view/click or any other revenue sharing agreement.

The user requests 806 for an electronic page by inputting a URL corresponding to the electronic page in an internet browser of computing device 802. Router 804 receives the request for the electronic page and in turn routes 808 the request for the electronic page to HTTP server 810 which retrieves the content corresponding to the electronic page. Thereafter, HTTP server 810 transmits 812 the electronic page corresponding to the URL to router 804. At this point, router 804 embeds a first script in the source code corresponding to the electronic page sent by HTTP server 810. Router 804 then transmits 814 the electronic page to the user computing device with the embedded first script. In order to associate one or more advertisements with the electronic page, the first script calls a second script. Thereafter, the first script and the second script collect a plurality of parameters consisting of the user's profile and the geographical location of the user's device. Also, the first script and the second script encrypt the URL and one or more of the plurality of parameters. Further, the encrypted URL and one or more parameters are combined to form a modified URL. The URL is encrypted in a way that the encrypted URL is in the same format as the URL requested by the user, therefore the browser and/or device of the user can not block the URL from being processed and thereby can not block the request for one or more advertisements to be associated with the electronic page. For example, if the user inputted URL was http://news.bbc.co.uk as mentioned above, the modified URL can be, http://news-.bbc.co.uk/tbv1234, where "tbv1234" represents one or more of the encrypted plurality of parameters. Thereafter, the modified URL is sent 816 from the user's device 802 to router 804. Upon receiving the modified URL, router 804 decrypts the URL and one or more parameters. Moving on, router 804 sends 818 the decrypted request for one or more advertisements and one or more parameters to a proprietary advertisement server 820. Proprietary advertisement server 820 analyses the request for one or more advertisements based on one or more of the content corresponding to the electronic page and one or more parameters corresponding to the user for identifying one or more targeted and relevant advertisements for the user. Proprietary advertisement server 820 may store one or more advertisement in a storage device coupled to proprietary advertisement server 820 or it may communicate with one or more advertisement service providers to determine and retrieve relevant advertisements.

Upon selecting one or more relevant advertisements, proprietary advertisement server 820 sends 822 the information to router 804. Router 804 associates one or more advertisements with the electronic page and renders 824 one or more advertisements along with the electronic page to the device 802. One or more advertisements can be displayed to the user in any of the existing rendering technologies such as, in-page advertisements, off-page advertisements, a pop-up window or by splitting the browser screen into two parts such that the advertisements appear as a banner at the top of the electronic page in the device. When user clicks on one or more advertisements associated with the electronic page or signs up for any service provided by advertisements, the network provider gets a revenue share on the advertisements. Further, proprietary advertisement server 820 may use a fraud management system to minimize the fraud clicks.

The method for associating one or more contents with an electronic page, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

Various embodiments of the invention provide methods and systems for associating one or more contents with an electronic page. One or more contents are selected based on the user's profile and the contents corresponding to the electronic page. Further, the invention provides a system and method to provide advertisements without getting blocked by a browser and/or a computing device of the user. Also, the invention provides a method of revenue generation for network providers.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for associating at least one content with an electronic page requested by a user, the method comprising:
   processing a request for the electronic page using a network routing device, the processing including:
   retrieving data associated with the electronic page;
   embedding by the network routing device at least one script in the electronic page, the at least one script corresponding to the at least one content and including a first Universal Resource Locator (URL);
   wherein the at least one script including the first URL in the electronic page is configured based upon a user profile corresponding to a user requesting the electronic page;
   executing the electronic page request such that the data associated with the electronic page includes the at least one script, the executing including replacing the first URL with a second encrypted URL corresponding to the electronic page; and
   wherein the at least one script is configured to deliver the at least one content by splitting a browser into at least two frames comprising a first frame and a second frame, the first frame displaying the at least one content of the second encrypted URL and the second frame displaying the electronic page requested by the user.

2. The method of claim 1, wherein the user profile comprises at least one of an age, gender, a set content preferences and language.

3. The method of claim 1 further comprising performing a predefined action if the at least one script is blocked for a predetermined time interval.

4. The method of claim 3, wherein the predefined action comprises at least one of:
   interrupting at least one service for a user; and
   redirecting the user to a predefined electronic page.

5. The method of claim 4, wherein the user is redirected to the predefined electronic page in response to interrupting a service for the user.

6. The method of claim 1, wherein a content belonging to the at least one script is an advertisement.

7. The method of claim 1, wherein a content belonging to the at least one script is a toolbar.

8. The method of claim 1, wherein the at least one script is configured to deliver the content in at least one of an in-page rendering of the at least one content, an off-page rendering of the at least one content, or a frame-based rendering of the at least one content.

9. A network routing device comprising:
   a transceiver; and
   a processor, adaptively coupled to the transceiver and configured to:
   process a request for associating at least one content with an electronic page, the request placed by a user using an electronic device in communication with the transceiver of the network routing device, the process including:
   retrieving data associated with the electronic page;
   embedding by the network routing device at least one script in the electronic page, the at least one script corresponding to the at least one content and including a first Universal Resource Locator (URL);
   wherein the at least one script including the first URL in the electronic page is configured based upon a user profile corresponding to the user requesting the electronic page;
   executing the electronic page request such that the data associated with the electronic page includes the at least one script, the executing including replacing the first URL with a second encrypted URL corresponding to the electronic page; and
   wherein the at least one script is configured to deliver the at least one content by splitting a browser into at least two frames comprising a first frame and a second frame, the first frame displaying the at least one content of the second encrypted URL and the second frame displaying the electronic page requested by the user.

10. The network routing device of claim 9, wherein the electronic device comprises one of a mobile device, a Personal Digital Access (PDA), a router, a computing device, an access point and a set top box.

11. A system for associating at least one content with an electronic page requested by a user using an electronic device, the system comprising:
   a network routing device in communication with the electronic device, the network routing device retrieving data associated with the electronic page requested by the user and the network routing device comprising:
   an embedding module for embedding at least one script in the electronic page requested, the at least one script corresponding to the at least one content and including a first Universal Resource Locator (URL);
   wherein the at least one script including the first URL in the electronic page is configured based upon a user profile corresponding to the user requesting the electronic page;
   an executing module for executing the electronic page requested by the user such that the data associated with the electronic page includes the at least one script, the executing including replacing the first URL with a second encrypted URL corresponding to the electronic page;
   a rendering module for rendering the at least one content along with the electronic page requested by the user in a predetermined format; and wherein the at least one script is configured to deliver the at least one content by splitting a browser into at least two frames comprising a first frame and a second frame, the first frame displaying the at least one content of the second encrypted URL and the second frame displaying the electronic page requested by the user.

12. The system of claim 11 further comprising a redirecting module for redirecting a user to a predefined electronic page when the at least one script is blocked for a predetermined time interval.

13. The system of claim 11 further comprising a storing module for storing the at least one script.

14. A computer program product comprising a non-transitory computer usable medium having a computer readable program code embodied therein for associating at least one content along with an electronic page, the computer program code performing:

processing a request for the electronic page using a network routing device, the processing including:

retrieving data associated with the electronic page;

embedding by the network routing device at least one script in the electronic page, the at least one script corresponding to the at least one content and including a first Universal Resource Locator (URL);

wherein the at least one script including a first URL in the electronic page is configured based upon a user profile corresponding to a user requesting the electronic page;

executing the electronic page request such that the data associated with the electronic page includes the at least one script, the executing including replacing the first URL with a second encrypted URL corresponding to the electronic page; and wherein the at least one script is configured to deliver the at least one content by splitting a browser into at least two frames comprising a first frame and a second frame, the first frame displaying the at least one content of the second encrypted URL and the second frame displaying the electronic page requested by the user.

* * * * *